(12) United States Patent
Klemes (10) Patent No.: US 9,686,001 B1
(45) Date of Patent: Jun. 20, 2017

(54) BEEM-STEERING APPARATUS FOR AN ANTENNA ARRAY

(71) Applicant: Marek Klemes, Kanata (CA)

(72) Inventor: Marek Klemes, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/953,222

(22) Filed: Nov. 27, 2015

(51) Int. Cl.
*H04B 7/04* (2017.01)
*H04B 7/0408* (2017.01)

(52) U.S. Cl.
CPC ........... *H04B 7/043* (2013.01); *H04B 7/0408* (2013.01)

(58) Field of Classification Search
CPC ........ H04B 7/043; H04B 7/0408; H01Q 3/36; H01Q 21/22; H01Q 21/0031
See application file for complete search history.

(56) References Cited

U.S. PATENT DOCUMENTS

| | | | |
|---|---|---|---|
| 6,184,828 B1 * | 2/2001 | Shoki | H01Q 3/26 342/372 |
| 2002/0171585 A1 | 11/2002 | Eiges | |
| 2004/0257292 A1 | 12/2004 | Wang | |
| 2006/0109067 A1 | 5/2006 | Shtrom | |
| 2006/0208944 A1 * | 9/2006 | Haskell | H01Q 1/246 342/368 |
| 2013/0093634 A1 | 4/2013 | Rowson et al. | |
| 2014/0266901 A1 * | 9/2014 | Klemes | H01Q 3/36 342/372 |

FOREIGN PATENT DOCUMENTS

| | | |
|---|---|---|
| CN | 1677749 | 10/2005 |
| CN | 1934750 | 3/2007 |

OTHER PUBLICATIONS

Liu et al., "Packages With Integrated 60GHz Aperture-Coupled Patch Antennas", IEEE Trans. Antennas and Propagation, vol. 59, No. 10, Oct. 2011.
Natarajan et al., "A Fully-Integrated 16-Element Phased-Array Receiver in SiGe BiCMOS for 60-GHz Communications", IEEE Journal of Solid-State Circuits, vol. 46, No. 5, May 2011.
Mousavi et al., "A Low-Cost Ultra Low Profile Phased Array System for Mobile Satellite Reception Using Zero-Knowledge Beamforming Algorithm", IEEE Transactions on Antennas and Propagation, vol. 56, No. 12, Dec. 2008.
Karavassilis et al., "Experimental HF circular array with direction finding and null steering capabilities", IEE Proceedings, Part H, vol. 133, No. 2, Apr. 1986.
Davies et al., "Electronic Steering of Multiple Nulls for Circular Arrays", Electronics Letters, vol. 13, No. 22, pp. 669-670, Oct. 27, 1977.

(Continued)

*Primary Examiner* — Syed Haider
(74) *Attorney, Agent, or Firm* — Gowling WLG (Canada) LLP (57) ABSTRACT

Beam-steering for a 2-dimensional array of an arbitrary number of radiating elements around both possible axes may be accomplished using a limited number of control components. By selectively coupling signal lines to different feed ports of the antenna array's feed network, it is possible to steer the main beam.

15 Claims, 11 Drawing Sheets

(56) References Cited

OTHER PUBLICATIONS

Ko, C.C., "Adaptive Array Processing Using the Davies Beamformer", IEE proceedings, vol. 133, Pt. H, No. 6, pp. 467-473, Dec. 1986.

Khanna et al., "Adaptive Beam Forming Using a Cascade Configuration", IEEE Transactions on Acoustics, Speech, and Signal Processing, vol. ASSP-31, No. 4, pp. 940-945, Aug. 1983.

Cvetkovic, "A Four Element Circular Array Direction Finding and Null Steering System", IEE Conf. Pub. 301, ICAP, 1989.

Sibille et al., "Beam Steering Circular Monopole Arrays for Wireless Applications"; 10th International Conference on Antennas and Propagation, Conference Publication No. 436, Apr. 14-17, 1997; IEE 1997.

Chang et al., "Design of a Beam Switching/Steering Butler Matrix for Phased Array System", IEEE Transactions on Antennas and Propagation, vol. 58, Issue 2, pp. 367-374, Feb. 2010.

Sheleg, Boris, "A Matrix-Fed Circular Array for Continuous Scanning", Proceedings of the IEEE, vol. 56, No. 11, pp. 2016-2028, Nov. 1968.

Moulder et al., "60-GHz Two-Dimensionally Scanning Array Employing Wideband Planar Switched Beam Network", IEEE Antennas and Propagation Letters, vol. 9, 2010.

International Search Report for International Appl. No. PCT/CN2016/076402 dated Aug. 19, 2016.

Kam, Dong Gun et al.; "Organic Packages with Embedded Phased-Array Antennas for 60-GHz Wireless Chipsets"; IEEE Transactions on Components, Packaging and Manufacturing Technology, vol. 1, No. 11, pp. 1806-1814; Nov. 2011.

Davis J.G. and A.A.P. Gibson; "Phase Mode Excitation in Beamforming Arrays"; Proceedings of the 3rd European Radar Conference; Sep. 2006.

Spinello, Fabio et al.; "High-Order Vortex Beams Generation in the Radio-Frequency Domain"; IEEE Antennas and Wireless Propagation Letters; vol. 15, 2016.

Schulze, Christian; "Angular acceleration with twisted light"; Physics Optics; May 26, 2014.

Mohammadi, Siavoush Mohaghegh et al.; "Orbital Angular Momentum in Radio—A System Study"; IEEE Transactions on Antennas and Propagation; vol. 48, No. 2; Feb. 2010.

* cited by examiner

Figure 11 ns
BEEM-STEERING APPARATUS FOR AN ANTENNA ARRAY

TECHNICAL FIELD

The current disclosure relates to steerable antenna arrays, and in particular to an apparatus for beam-steering an antenna array.

BACKGROUND

Antenna arrays are used to provide an antenna that has a main beam or lobe that can be steered. The steering of the main beam allows the antenna to transmit in a preferential direction, namely the direction of the main beam, or provide increased reception sensitivity to signals received from the direction of the main beam. Antenna arrays generally comprise a plurality of individual radiating elements, which may also be referred to as array elements, whose transmission or reception is phase-shifted relative to other radiating elements. Circuitry for beam-steering, or controlling the transmission/reception direction of the main beam, may comprise individual phase-shifters and/or delay units for each of the individual radiating elements. As the target frequency range of an antenna increases, the ideal spacing of radiating elements in the array decreases. The reduced spacing between radiating elements may increase the complexity in implementing the beam-steering circuitry and feed network used to connect to the radiating elements. Further, the beam-steering circuitry may require a relatively large number phase-shifters and/or delay units, especially when it is required to steer the beam in 2 dimensions, which may increase the cost and complexity.

Additional, alternative, and/or improved beam-steering of an antenna array is desirable.

BRIEF DESCRIPTION OF THE DRAWINGS

Embodiments are described herein with reference to the appended drawings, in which.

DETAILED DESCRIPTION

In accordance with the present disclosure there is provided an apparatus for beam-steering an antenna array comprising: a plurality of feed ports for coupling to respective phase-mode ports of an antenna array's feed network; a main port coupled to a transceiver; a phase-mode feed port selector for selectively coupling first and second signal lines to respective ones of the plurality of feed ports; and a signal processing circuit for processing signals between the first and second signal lines and the main port, the processing allowing independent scanning of a main beam of the antenna array in both a radial direction and a circumferential direction relative to an array axis perpendicular to a plane of the antenna array.

In a further embodiment of the apparatus for beam-steering, the phase-mode feed selector selectively couples the first signal line to a feed port associated with an $n^{th}$ phase-mode port of the antenna array's feed network and the second signal line to a feed port associated with an $n^{th}+1$ or $n^{th}-1$ phase-mode port of the antenna array's feed network.

In a further embodiment of the apparatus for beam-steering, wherein the signal processing circuit comprises: a first hybrid splitter/combiner; a first variable phase shifter connected between the first signal line and the first hybrid splitter/combiner; a second hybrid splitter/combiner coupled to the second signal line and the first hybrid splitter/combiner; a third hybrid splitter/combiner coupled to the second hybrid splitter/combiner; and a pair of variable phase shifters connected between the second hybrid splitter/combiner and the third hybrid splitter/combiner.

In a further embodiment of the apparatus for beam-steering, the pair of variable phase shifters and the first variable phase shifter are independently controllable.

In a further embodiment of the apparatus for beam-steering, the first, second and third phase shifters are controlled over a range of $-\pi$ to $+\pi$ radians In a further embodiment of the apparatus for beam-steering, the phase-mode feed selector further couples a third signal line to a respective one of the plurality of feed ports through a fourth phase shifter controlled in opposition to the first phase shifter to the first hybrid splitter/combiner.

In a further embodiment of the apparatus for beam-steering, a steered main beam is described by: $M=k[P_{n+/-1} \cos \emptyset - P_n e^{j\theta} \sin \emptyset]$ where: k is a constant; $P_n$ is provided by the first signal line; $P_{n+/-1}$ is provided by the second signal line; $\emptyset$ is provided by a radial control signal for controlling the pair of variable phase shifter; and $\theta$ is provided by a circumferential control signal for controlling the third variable phase shifter.

In a further embodiment of the apparatus for beam-steering, a total number of hybrid splitter/combiners and variable phase shifters is independent of a number of antenna elements in the antenna array.

In a further embodiment, the apparatus for beam-steering further comprises a cascaded input coupled to a cascaded main port of a cascaded circuitry for processing signals of the $0^{th}$ phase mode, the $-1^{st}$ phase mode and the $+1^{st}$ phase mode, wherein the a phase-mode feed port selector can selectively couple the cascaded input to the second line.

In accordance with the present disclosure there is further provided a steerable antenna array system comprising: an antenna array feed network comprising a plurality of radiating elements arranged in a circular planar array and a plurality of phase-mode ports each associated with a different phase-mode of the antenna array; and an apparatus for beam-steering an antenna array comprising: a plurality of feed ports for coupling to respective phase-mode ports of the antenna array's feed network; a main port coupled to a transceiver; a phase-mode feed port selector for selectively coupling first and second signal lines to respective ones of the plurality of feed ports; and a signal processing circuit for processing signals between the first and second signal lines and the main port, the processing allowing independent scanning of a main beam of the antenna array in both a radial direction and a circumferential direction relative to an array axis perpendicular to a plane of the antenna array.

In a further embodiment of the system, the phase-mode feed selector selectively couples the first signal line to a feed port associated with an $n^{th}$ phase-mode port of the antenna array's feed network and the second signal line to a feed port associated with an $n^{th}+1$ or $n^{th}-1$ phase-mode port of the antenna array's feed network.

In a further embodiment of the system, the signal processing circuit comprises:
a first hybrid splitter/combiner;
a first variable phase shifter connected between the first signal line and the first hybrid splitter/combiner;
a second hybrid splitter/combiner coupled to the second signal line and the first hybrid splitter/combiner;
a third hybrid splitter/combiner coupled to the second hybrid splitter/combiner; and
a pair of variable phase shifters connected between the second hybrid splitter/combiner and the third hybrid splitter/combiner.

In a further embodiment of the system, the pair of variable phase shifters and the first variable phase shifter are independently controllable.

In a further embodiment of the system, the first, second and third phase shifters are controlled over a range of $-\pi$ to $+\pi$ radians In a further embodiment of the system, the phase-mode feed selector further couples a third signal line to a respective one of the plurality of feed ports through a fourth phase shifter controlled in opposition to the first phase shifter to the first hybrid splitter/combiner.

In a further embodiment of the system, a steered main beam is described by: $M=k[P_{n+/-1} \cos \emptyset - P_n e^{j\theta} \sin \emptyset]$ where: k is a constant; $P_n$ is provided by the first signal line; $P_{n+/-1}$ is provided by the second signal line; $\emptyset$ is provided by a radial control signal for controlling the pair of variable phase shifter; and $\theta$ is provided by a circumferential control signal for controlling the third variable phase shifter.

In a further embodiment of the system, a total number of hybrid splitter/combiners and variable phase shifters is independent of a number of antenna elements in the antenna array.

In a further embodiment, the system further comprises a cascaded input coupled to a cascaded main port of a cascaded circuitry for processing signals of the $0^{th}$ phase mode, the $-1^{st}$ phase mode and the $+1^{st}$ phase mode, wherein the a phase-mode feed port selector can selectively couple the cascaded input to the second line.

In accordance with the present disclosure there is further provided a method for beam-steering an antenna array comprising: receiving an indication of a steering direction of a main lobe; determining two of a plurality of phase mode ports for providing the desired steering direction; generating control signals for coupling the determined phase mode ports to respective first and second signal lines; determining first and second phase shifting values for applying to the respective signal lines to provide the steering direction, the first and second phase shifting values allowing independent scanning of a main beam of the antenna array in both a radial direction and a circumferential direction relative to an array axis perpendicular to a plane of the antenna array; generating first and second phase shifting signals according to the determined first and second phase shifting values.

In a further embodiment of the method, a steered main beam is described by: $M=k[P_{n+/-1} \cos \emptyset - P_n e^{j\theta} \sin \emptyset]$ where: k is a constant; $P_n$ is provided by the first signal line; $P_{n+/-1}$ is provided by the second signal line; $\emptyset$ is provided by the first phase shifting signal for controlling a pair of variable phase shifter; and $\theta$ is provided by the second phase shifting signal for controlling a further variable phase shifter.

As described further below, beam-steering for a 2-dimensional array of an arbitrary number of radiating elements around both possible axes may be accomplished using a limited number of control components. By selectively coupling signal lines to different feed ports of the antenna array's feed network, it is possible to steer the main beam. Further, by selectively coupling signal lines to higher-order phase modes of a circular antenna array's feed network it is possible to provide steering of the main beam over an extended range. As described further below, it is possible to use 3 phase-shifters in combination with 3 hybrid splitter/combiners, referred to as hybrids for brevity, through proper selection of phase-mode feed connections to the phase-mode feed network of an antenna array. Although the beam-steering techniques described herein may be used for beam-steering of antenna arrays broadly, the techniques may be well suited to large, planar circular arrays of small radiating elements for microwave and higher frequencies with radiating elements spaced approximately half a wavelength apart and requiring 2-axis control of the antenna array's main beam direction over a selectable range around the antenna array's nominal pointing direction. By using a fixed number of control components such as phase-shifters and hybrids to control an arbitrary number of radiating elements, the current beam-steering technique may reduce the difficulty of integrating the control components which do not scale appreciably with wavelength into the antenna array structure. The complexity of associated chip interconnections, as well as calibration and control processes may also be reduced due to the fixed number of control components.

Figure 1:
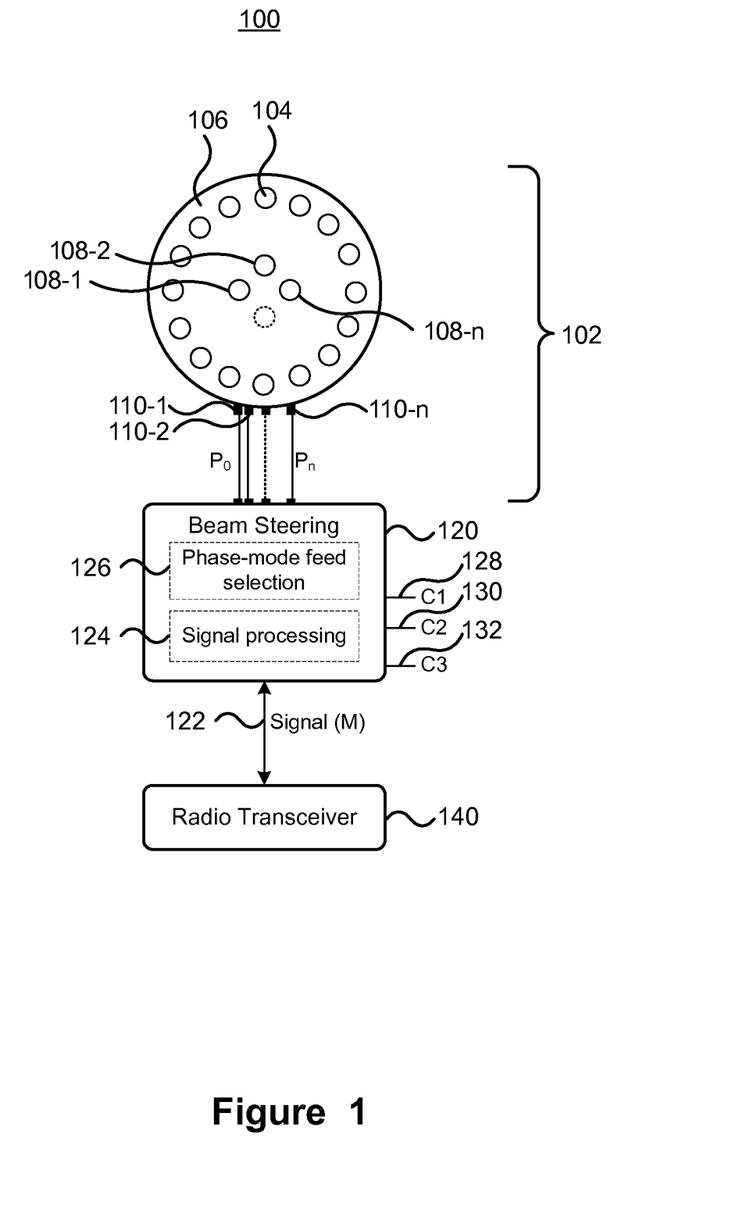
FIG. 1 depicts components of a steerable circular antenna array system.

FIG. 1 depicts components of a steerable antenna array system. As will be appreciated, the antenna array system may be used for both the transmission and reception. The system 100 comprises an antenna array and feed network 102. Although other antenna array arrangements are possible, the following provides illustrative embodiments in which the antenna array is considered to be a plurality, N, of radiating elements (not shown in FIG. 1 for clarity) arranged in a planar circular array. The individual radiating elements are arranged at a spacing of approximately ½ the wavelength at which the antenna array is designed to operate. Each of the individual radiating elements is connected to a respective radiating element probe 104 that provides the transmission or reception signal to or from the radiating elements. The radiating element probes 104 are arranged in a circular pattern about a periphery of a circular TEM (transverse electromagnetic) region 106 of a radial waveguide transition assembly. A plurality, n<N, of phase-mode feed probes 108-1, 108-2, to 108-n (referred to collectively as phase-mode feed probes 108) are arranged in a circular pattern that is coaxial with the circular pattern of the radiating element probes 104. In FIG. 1, n is depicted as equaling 4; however, other values may be used. For example, n=8 or 16 may be used. It is often convenient to select n as a power of 2 due to the number of ports of a Butler Matrix. The phase-mode feed probes may be spaced approximately ¼ of a wavelength apart. The phase-mode feed probes 108 may be coupled to phase-mode feed ports 110-1, 110-2, to 110-n (referred to collectively as phase-mode feed ports 110) of the antenna array and feed network 102. The phase-mode feed ports 110 may be coupled to the phase-mode feed probes 108 through a beam-forming network (not shown) such as a Butler matrix. When the phase-mode feed ports 110 are coupled to the phase-mode feed probes 108 through a beam-forming network, such as a 4×4 Butler matrix, each of the phase-mode feed ports 110 may correspond to the antenna array transmitting, or receiving, signals according to different orders of phase modes. For example, port 110a may correspond to the 0 order phase mode, port 110b the −1 order phase mode, 110b the +1 order phase mode and 110d to the +2 phase mode. Radiation patterns associated with each of the different phase modes are depicted in FIGS. 2 through 4.

Figure 2:
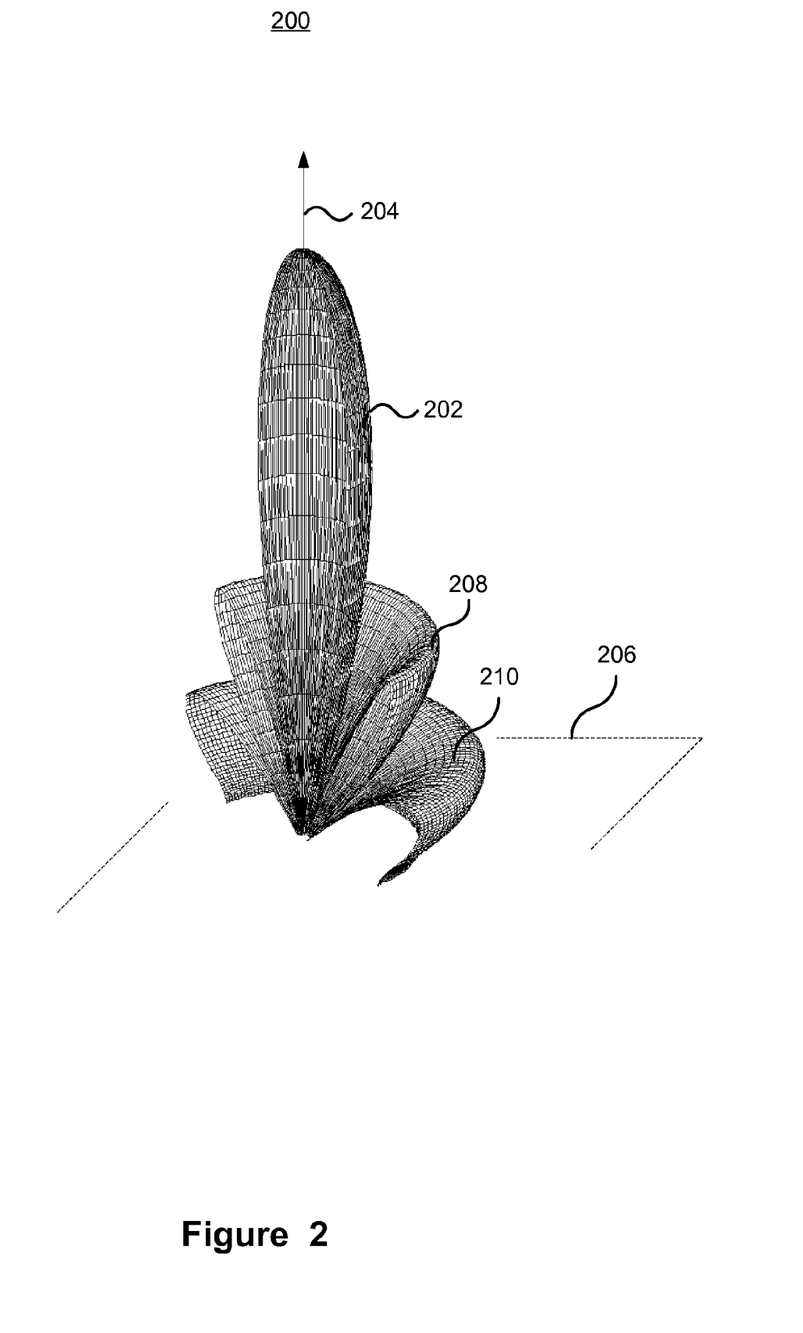
FIG. 2 depicts a radiation pattern associated with a phase mode of a circular antenna array.

FIG. 2 depicts the far-field radiation pattern associated with the 0 order phase mode. As can be seen in FIG. 2, the radiation pattern 200 comprises a main beam 202 that is pointed in a main direction that is aligned with an axis 204 perpendicular to a radiating plane 206, in which the radiating elements of the antenna lie. The radiation pattern 200 includes a number of side lobes 208, 210 which are shaped as cones surrounding the main beam 202. Although not depicted graphically in FIG. 2, there is no phase progression with physical angles in the main beam 202.

Figure 3:
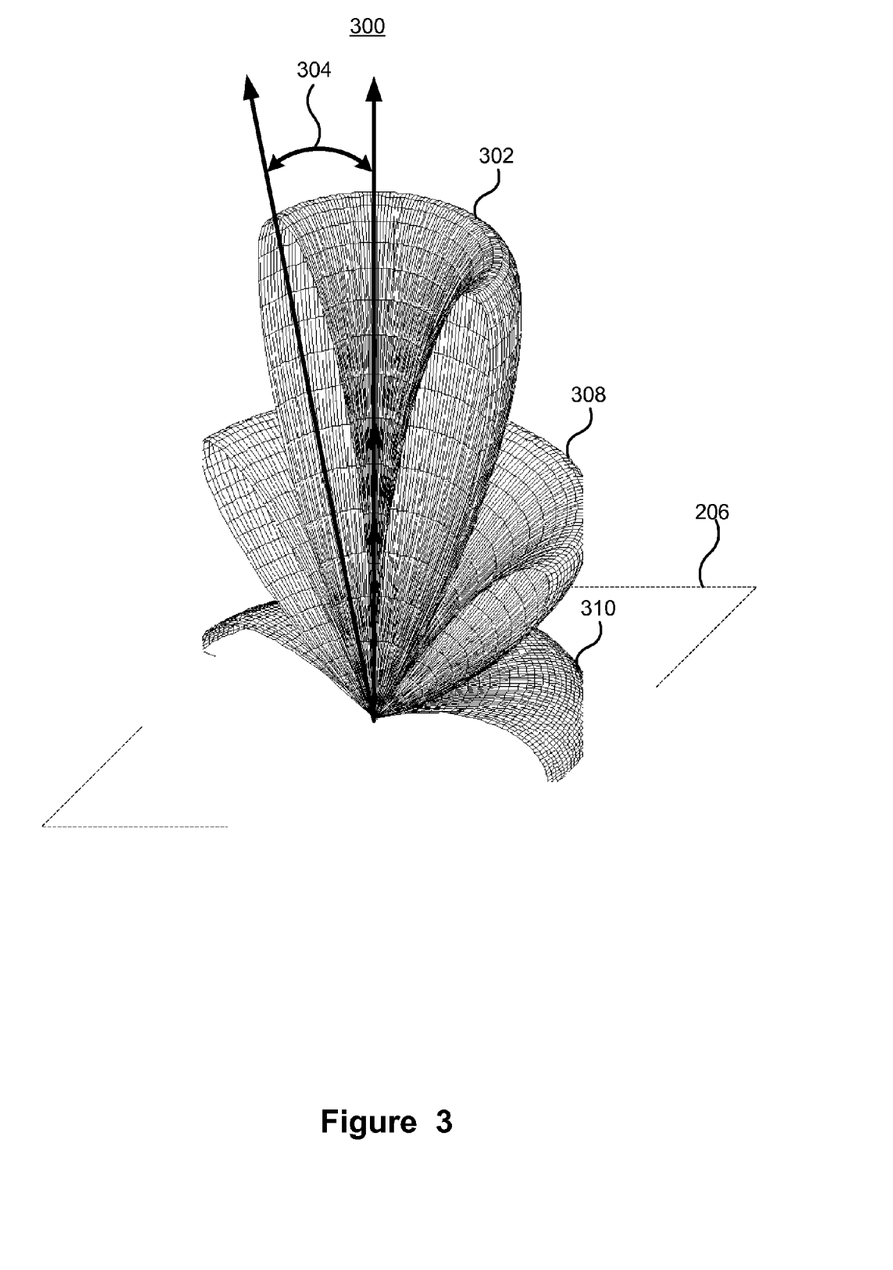
FIG. 3 depicts a further radiation pattern associated with a further phase mode of a circular antenna array.

FIG. 3 depicts a further far-field radiation pattern associated with the +1 phase mode. A radiation pattern of the −1 phase mode would have the same shape of the radiation pattern 300, however, the phase progression with respect to an azimuth angle would be opposite. The phase progression for both the +1 and −1 phase mode are one complete cycle of $2\pi$ radians, but in opposite directions about the z-axis, or the axis perpendicular to the radiating plane 206. The radiation pattern 300 comprises a main beam 302 that is centered about the axis 204 perpendicular to the radiating plane 206. The main beam 302 is a cone having an angle 304 from the axis 204. The radiation pattern 300 also includes side lobes 308, 310.

Figure 4:
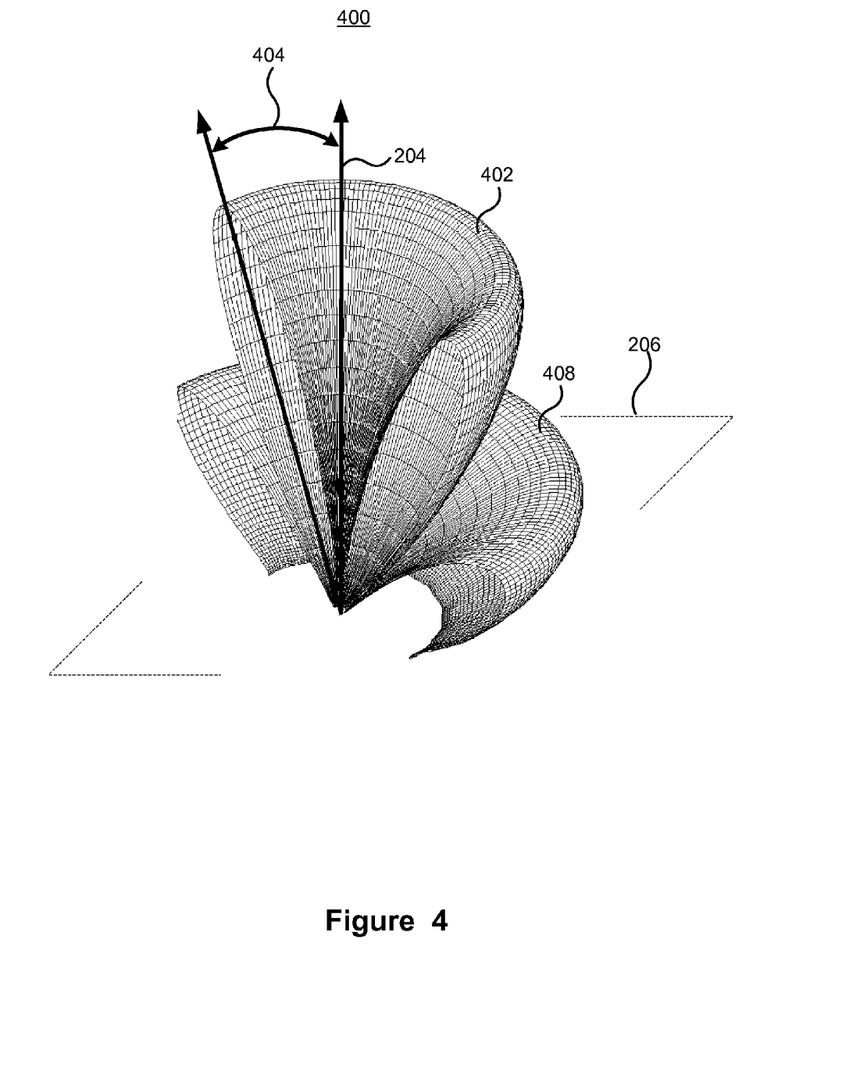
FIG. 4 depicts a further radiation pattern associated with a further phase mode of a circular antenna array.

FIG. 4 depicts a further far-field radiation pattern associated with the +2 phase mode. The radiation pattern 400 is similar to the radiation pattern 300 and has a main beam 402 centered about the axis 204 perpendicular to the radiating plane 206. The main beam 402 is a cone having an angle 404 from the axis 204. The angle 404 of the main beam 402 is greater than the angle of the main beam 302 of the +1 phase mode. That is, the main beam 402 is wider than the main beam 302. The radiation pattern 400 also includes side lobes 408.

Returning to FIG. 1, the system 100 further comprises a beam steering component 120 that can couple a main port 122 to one or more of the phase-mode feed ports 110. The main port 122 provides the steered main beam, either for transmission or reception. For transmission, the signal processing functionality 124 allows independent scanning of a main beam of the antenna array in both a radial direction and a circumferential direction relative to an array axis perpendicular to a plane of the antenna array. Similarly, during reception, the signal processing functionality allows the independent scanning of the main beam's reception direction in both the radial direction and the circumferential direction. As described further below, the signal processing component 124 may be controlled by a plurality of control signals, including an indication of the radial scanning direction and an indication of the circumferential scanning direction. The control signals may comprise a first control signal, C1, 128 providing an indication of the radial scanning direction and a second control signal, C2, 128 providing an indication of the circumferential scanning direction.

The beam steering component 120 further includes a phase-mode feed selection component 126 that allows signal lines of the signal processing to be selectively coupled to the different phase-mode feed ports 108 of the antenna array and feed network 102. The phase-mode feed selection component 126 allows selection of one or more phase-modes to use for the transmission/reception. As depicted in FIGS. 2 through 4, the different phase modes have progressively wider main beams. By selecting different phase-modes, different ranges of steering of the main beam are possible. One or more control signals, depicted by a third control signal, C3, 132, may be used to select the phase-mode feed ports to which the signal lines are coupled.

As described above, the phase-mode feed selection allows coupling respective signal lines to one or more of the phase-mode feed ports 110, which results in combining of the radiation patterns of the particular phase modes. The phase-mode feed selection may be viewed as selecting a possible range of tilt, or radial steering, of the main beam. The independent control provided by the signal processing provides further tilt, or radial, steering within the selected range as well as steering the beam circumferentially about the array's radiation axis.

Figure 5:
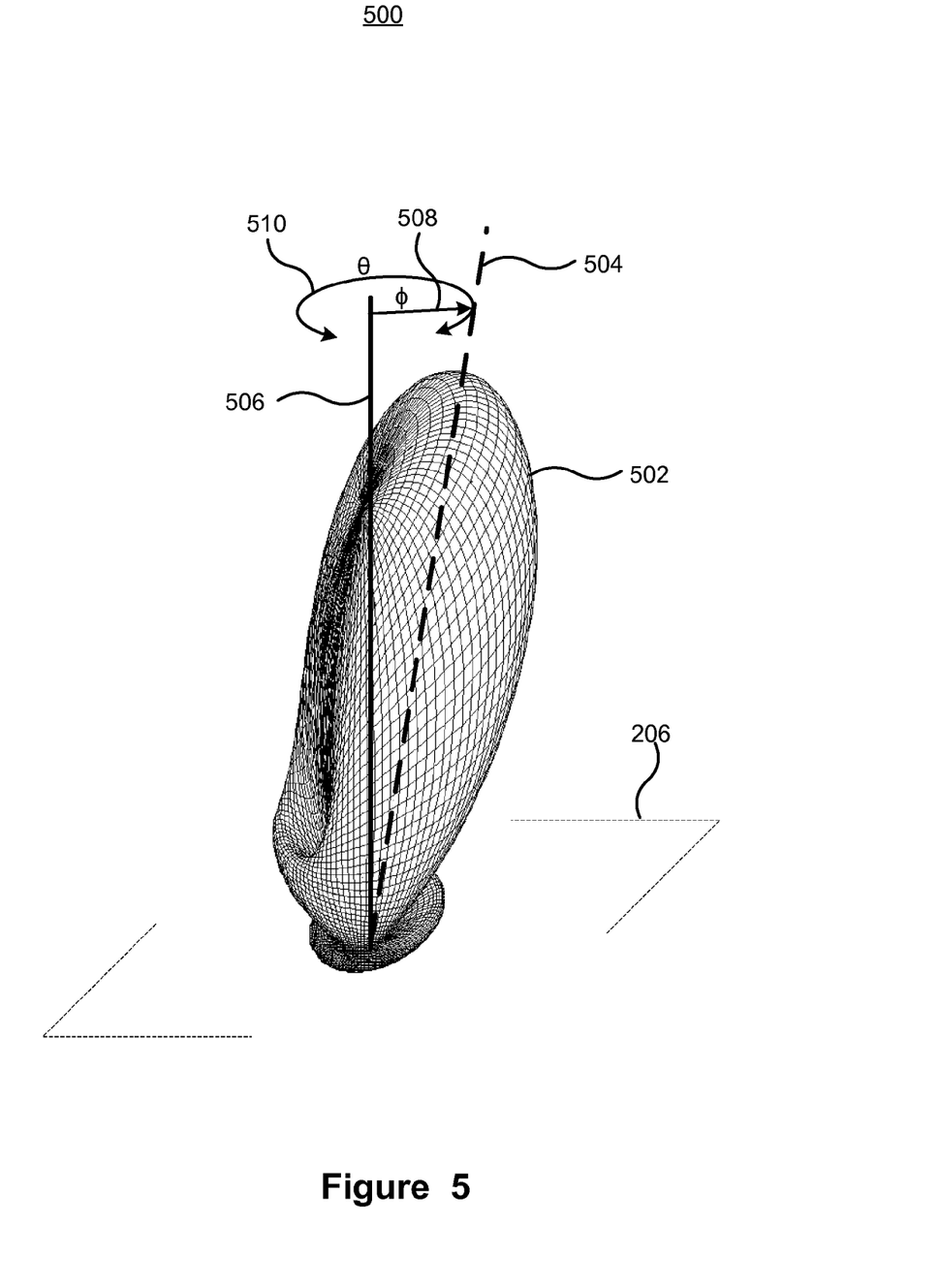
FIG. 5 depicts a further radiation pattern associated with a combination of phase modes of a circular antenna array.

FIG. 5 depicts a further pattern associated with a combination of phase modes. In particular the radiation pattern 500 is a combination of the −1 phase mode radiation pattern 300 and the 0 phase mode radiation pattern 200. It is noted that there is limited steering radially. Accordingly, the radiation pattern 500 depicts a starting range from which the radiation pattern may be further steered. One steering parameter, $\phi$ 508 may control the radial steering amount within the selected range, or how much the main beam 502 is tilted, depicted by line 504, from an axis 506 perpendicular to the radiating plane 206. A second steering parameter, $\theta$, 510 can steer the main beam about the circumference of the phase-mode radiation pattern.

Figure 6:
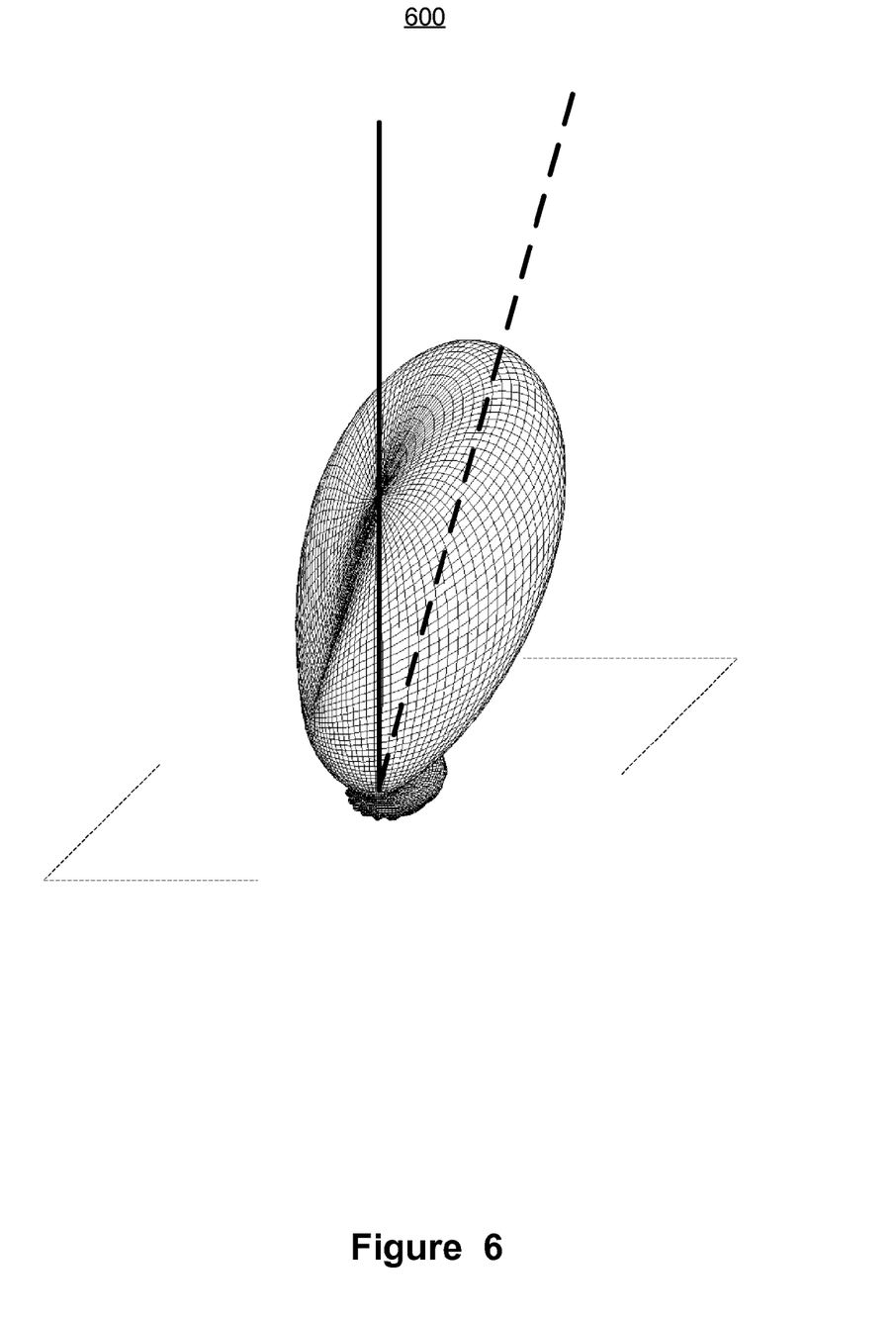
FIG. 6 depicts a further radiation pattern associated with a further combination of phase modes of a circular antenna array.

FIG. 6 depicts a further pattern associated with a further combination of phase modes. The radiation pattern 600 is a combination of the −2 phase mode and the −1 phase mode. The radiation pattern 600 is similar to the radiation pattern 500; however the radiation pattern has a greater radial tilt. Although the radial steering angle is greater, the directivity in the circumferential direction is not as great as that of radiation pattern 500.

Figure 7:
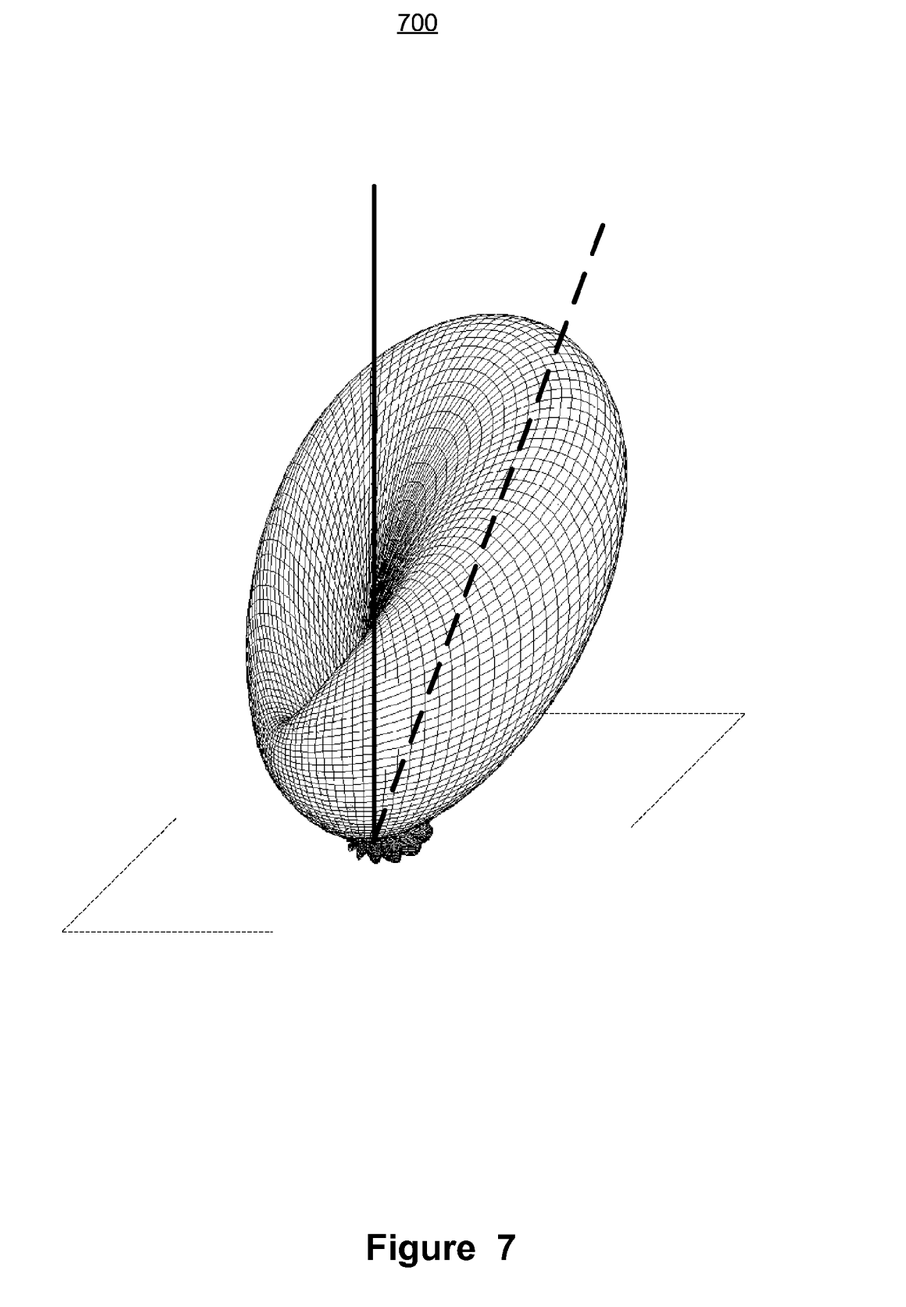
FIG. 7 depicts a further radiation pattern associated with a further combination of phase modes of a circular antenna array.

FIG. 7 depicts a further pattern associated with a further combination of phase modes. The radiation pattern 700 is a combination of the −3 phase mode and the −2 phase mode. The radiation pattern 700 is similar to the radiation pattern 600; however the radiation pattern has a greater radial tilt. Although the radial steering angle is greater, the directivity in the circumferential direction is not as great as that of radiation pattern 600.

As can be seen from FIGS. 5 through 7, combining different phase mode radiation patterns can provide a radiation pattern that is tilted relative to an axis perpendicular to the radiating plane. The radiation pattern may be further tilted within the selected range. Further, the main beam may be steered circumferentially about the axis perpendicular to the radiating plane. By selecting the phase modes being combined, an initial tilt range is selected from which additional steering, independently in both the radial and circumferential directions, is possible.

Figure 8:
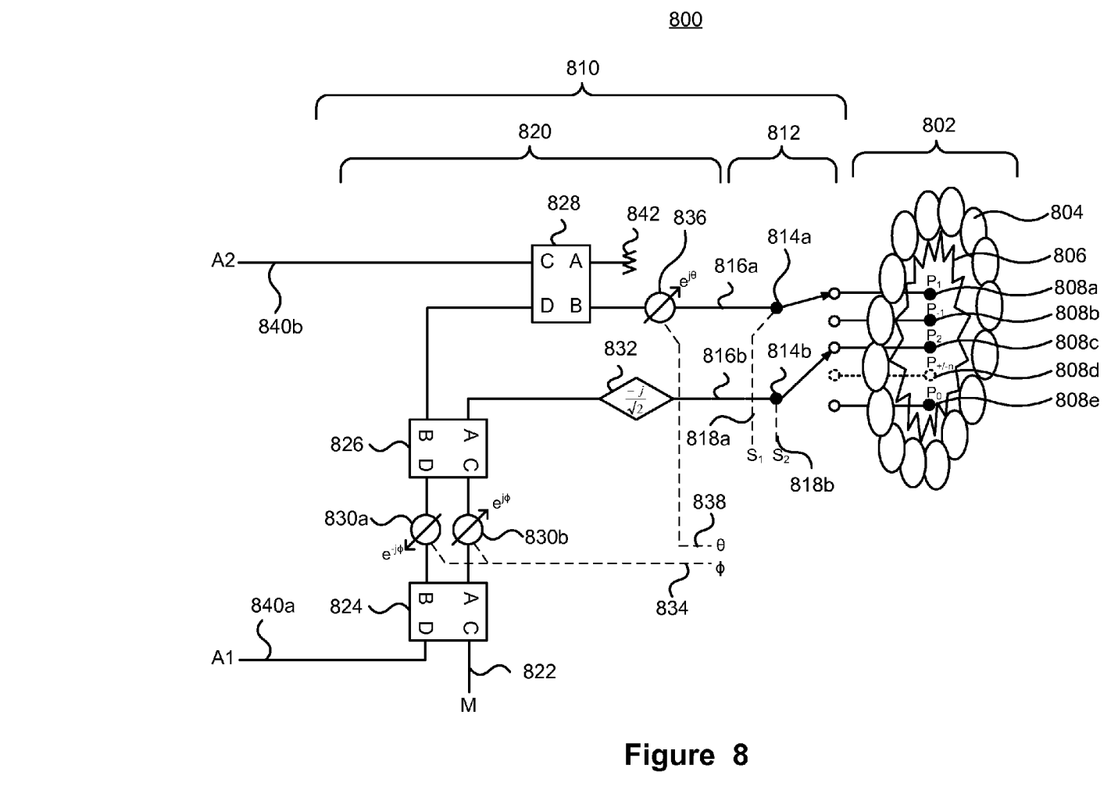
FIG. 8 depicts components of a steerable circular antenna array.

FIG. 8 depicts components of a steerable antenna array system. The system 800 comprises an antenna array and feed network 802 which is coupled to a beam steering apparatus or circuitry 810. The antenna array and feed network 802 transmits or receives signals. The beam steering apparatus 810 is coupled between the antenna array and feed network 802 and a transceiver. When receiving signals, the beam steering apparatus 810 combines received signals from different phase modes of the antenna array and provides a main beam signal to the transceiver. When transmitting, the beam steering apparatus 810 generates the required signals for the different phase modes of the antenna array and feed network in order to transmit the main beam signal in a particular direction.

The antenna array and feed network 802 comprises a plurality of individual radiating elements 804 arranged circumferentially in a radiating plane. Each of the radiating elements 804 is coupled to a feed network, depicted schematically as a star 806, having a number of phase-mode feed probes coupled to phase-mode feed ports 808a, 808b, 808c, 808d, 808e (referred to collectively as phase-mode feed. Each of the different phase-mode feed ports 808 is associated with a different phase-mode of the antenna array. The antenna array and feed network 802 is depicted as having 4 phase-mode feed ports 804a, 804b, 804c, 804e however, it is possible to have additional phase-mode feed ports, depicted as port 804d in order to allow transmission and reception of different order phase modes. The feed network 806 depicted in FIG. 8 is depicted as having phase mode feed ports associated with the zeroth order phase mode (port 808e), the positive first order phase mode (port 808a), the negative first order phase mode (port 808b) and the positive second order phase mode (port 808c).

When transmitting, one or more of the phase-mode feed ports 808 are driven with appropriate signals from the beam steering apparatus 810 in order to generate the desired radiation pattern. When receiving, the beam steering apparatus 810 receives signals from one or more of the phase-mode feed ports 808.

The beam-steering apparatus 810 comprises a phase-mode feed selector 812 for selectively coupling a first signal line 816a and a second signal line 816b (referred to collectively as signal lines 816) to respective ones of the plurality of feed ports 808 of the antenna array's feed network. Each of the signal lines 816 can be selectively coupled, for example by switching circuitry 812, to a particular phase-mode feed port of the beam steering apparatus, which in turn may be coupled to corresponding phase-mode feed ports of the antenna array and feed network 802. The signal lines 816 provide the input to processing circuitry 820 of the beam steering apparatus 810 for receiving signals and provide the output from the processing circuitry 820 of the beam steering apparatus 810 for transmitting signals. The switching circuitry 812, may be provided with respective switches 814a, 814b that are controlled by respective control signals 'S1' 818a and 'S2' 818b. The switching circuitry 812 may be controlled in order to couple the first signal line 816a to a particular phase-mode feed port and to couple the second signal line 816b to another phase-mode feed port that is one phase mode higher or lower than the phase-mode coupled to the first signal line. For example, the first signal line 816a may be connected to the $2^{nd}$ order phase mode feed port and the second signal line 816b may be connected to the $1^{st}$ order phase mode feed port.

The signal processing circuitry 820 comprises a number of components including a plurality of hybrid splitter/combiners 824, 826, 828 and a plurality of variable phase shifters 830a, 830b, 836. Each of the hybrid splitter/combiners 824, 826, 828 is a bi-directional 4-port component. The ports of the hybrid splitter/combiners may function as inputs or outputs depending upon whether receiving or transmitting and how the hybrids are connected. Each of the hybrids has 4 ports that may be labelled as 'A', 'B', 'C', 'D' with the relationship between the ports' signals given by:

$$\begin{bmatrix} C \\ D \end{bmatrix} = \frac{1}{\sqrt{2}} \begin{bmatrix} 1 & 1 \\ 1 & -1 \end{bmatrix} \cdot \begin{bmatrix} A \\ B \end{bmatrix} \qquad (1)$$

As depicted in FIG. 8, a main beam signal line 822 is coupled to the 'C' port of a first hybrid 824. The 'A' port is coupled to the 'C' port of a second hybrid 826 through a first variable phase shifter 830b. The 'B' port of the first hybrid is coupled to the 'D' port of the second hybrid 826 through a second variable phase shifter 830b. The first and second variable phase shifters 830a, 830b are controlled to provide an equal magnitude but opposite phase shift. The phase shift provided by the variable phase shifters 830a, 830b, depicted as φ 834, controls radial angle, or tilt, of the direction of the main beam. The 'D' port of the first hybrid 824 may be used as an auxiliary signal 'A1' 840a, which may be used for various purposes including for example interference mitigation, direction finding and/or feedback for control of the beam steering apparatus 810 by external circuitry (not shown).

As depicted in FIG. 8, the 'B' port of the second hybrid 826 is coupled directly to the 'D' port of a third hybrid 828. The 'A' port of the second hybrid 826 is coupled to the second signal line 816b through a fixed relative delay and gain compensation component 832 $-j/\sqrt{2}$ having nominal phase of $-90$ degrees and amplitude loss of $1/\sqrt{2}$. All unused ports of the phase-mode feed network and of the beam steering circuitry may be terminated in matched loads by the switching circuitry.

Turning to the third hybrid 828, the 'C' port of the third hybrid may be used as a second auxiliary signal 'A2' 840b. The 'A' port of the third hybrid may be terminated as depicted schematically by connection 842. The 'B' port of the third hybrid 828 is coupled to the first signal line 816a through a third variable phase shifter 836. The phase shift provided by the variable phase shifter 836, depicted as θ 838, controls the circumferential direction of the main beam.

The transmission or reception direction of the main beam may be controlled by selecting which phase mode feed ports will be connected to the beam-steering apparatus. The selection determines which phase mode radiation patterns will be combined, and so determines a possible radial, or tilt, range for the main beam. The radial angle of the main beam may be further steered by varying the phase shift provided by the pair of variable phase shifters 830a, 830b through the φ control signal 834. The circumferential direction of the main beam may be steered by varying the phase shift provided by the θ signal 838. The phase shifters may be varied over a range of $-\pi$ to $+\pi$ radians. For reception, the signal M 822 provided to the receiver is described by:

$$M = k[P_{n+/-1} \cos \varnothing - P_n e^{j\theta} \sin \varnothing] \qquad (2)$$

Where:
  k is a constant;
  $P_n$ is provided by the first signal line 816a;
  $P_{n+/-1}$ is provided by the second signal line 816b;
  Ø is provided by the radial control signal 834; and
  θ is provided by the circumferential control signal 838.

Figure 9:
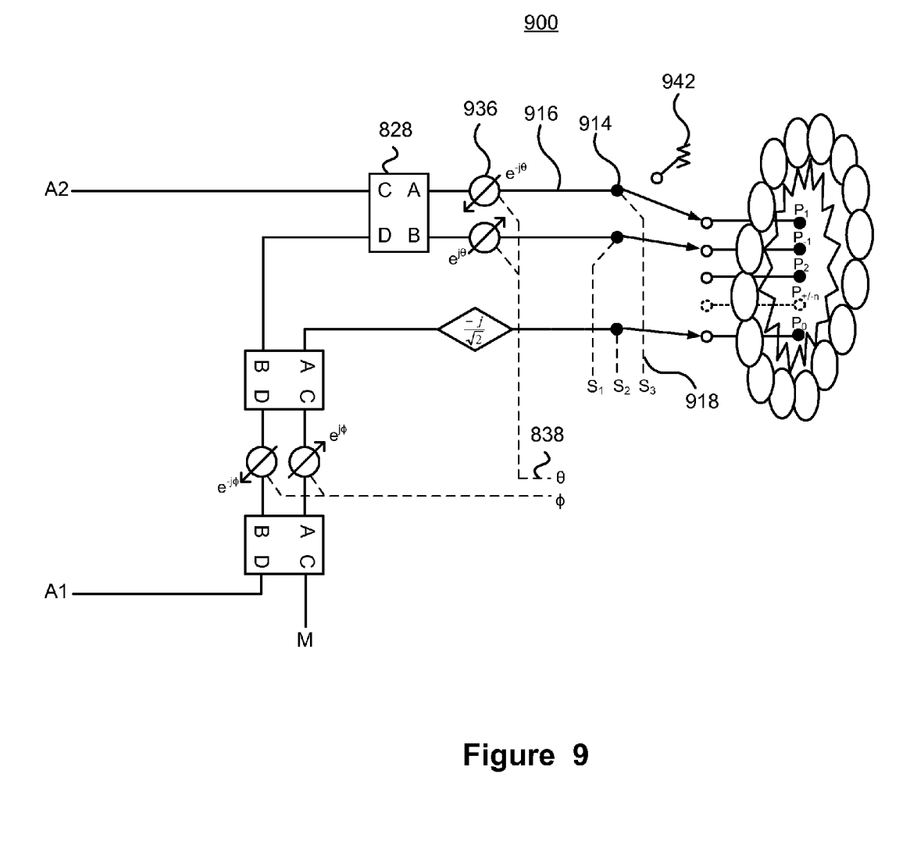
FIG. 9 depicts components of a further steerable circular antenna array.

FIG. 9 depicts components of a further steerable antenna array system. The system 900 is similar to the system 800 described above and as such only the differences will be described further herein. In contrast to the system 800 in which the 'A' port of the third hybrid was terminated 838, in the system 900 the 'A' port of the third hybrid 828 is coupled to a third signal line 916 through a fourth variable phase shifter 936. The fourth variable phase shifter 936 provides the same magnitude, but opposite direction, phase shift as the variable phase shifter 836 and is controlled by signal θ 838. The third signal line 916 may be selectively coupled to phase-mode feed ports of the feed network through a third switch 914 of the switching circuitry. The third switch 914 may selectively couple the third signal line 916 to a phase mode feed port or to a termination port 942. The third switch 914 may be controlled by a third control signal 'S3' 918.

The system 900 may operate in the same manner as the system 800 by connecting the third signal line 916 to the termination port 942. Alternatively, the first, second and third signal lines 814a, 814b, 914 may be connected to respective phase-mode feed ports of the antenna array's feed network. For example, the second signal line 814b may be connected to the zero-th order phase mode feed port ($P_0$), the first signal line 814a may be connected to the first phase mode feed port ($P_1$) and the third signal line 914 may be connected to the negative-first phase mode feed port ($P_{-1}$). In such a connection there is no phase progression with physical angles in the steered main beam M. Since there is no phase progression in the main beam, it can be used in place of the 0-order phase-mode at an input phase-mode port of a cascaded beam-steering apparatus, such as one of the type shown in FIG. 8.

Figure 10:
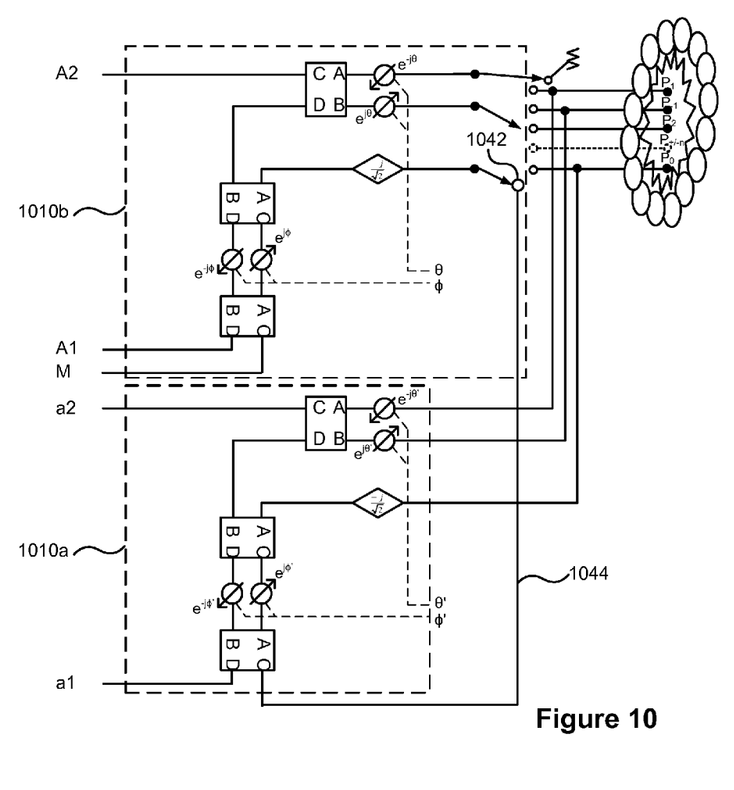
FIG. 10 depicts components of a further steerable circular antenna array.

FIG. 10 depicts components of a further steerable antenna array having cascaded beam-steerers. The system 1000 comprises two beam steering subsystems 1010a, 1010b cascaded together. The first beam-steerer 1010 comprises first, second and third signal lines coupled to the zero-th order phase mode feed port ($P_0$), the first phase mode feed port ($P_1$) and the negative-first phase mode feed port ($P_{-1}$) respectively. With the beam steering circuitry 1010a coupled to the $P_0$, $P_1$, and $P_{-1}$ phase mode feed ports, the resultant steered main beam may have no phase progression.

The second beam-steerer 1010b includes a port 1042 coupled to the steered main beam 1044 of the first beam-steerer circuitry 1010a. The switching circuitry of the second beam-steerer 1010b may be selectively coupled to the steered main beam 1044. The remaining phase-mode input port of the second beam-steerer would be connected to the first or negative-first phase-mode port of the same phase-mode feed network. Cascading the steered main beam without phase progression with the beam steering circuitry of the second beam-steerer in this way allows greater range in radial steering of the main beam at the output of the second beam-steerer. As depicted, with two cascaded beam-steerers 1010a, 1010b, there are additional auxiliary ports 'a1' and 'a2' that may be used for various purposes including for example interference mitigation, direction finding and/or feedback for control of the beam steering.

The beam steering circuitry described above may be used for controlling the steering of a main beam transmitted or received by a phase mode feed antenna and feed network. The antenna array described above comprises a circular array of a number of radiating elements that are capable of transmitting and receiving in different phase modes. The beam steering circuitry could also be used in controlling the beam steering of a non-circular array. For example, the antenna array may be for example, a square of polygonal filled central array for the $P_0$ and a polygonal peripheral ring array for the $P_n$ and the $P_{-n}$ phase modes. The antenna may alternatively use a filled circular array such as a radial slot array. The filled circular array may be excited from multiple feeds to effect different phase modes. Further, the above beam steering circuitry has been described as using variable phase shifters. The phase shifting functionality may be provided as IQ modulators.

Figure 11:
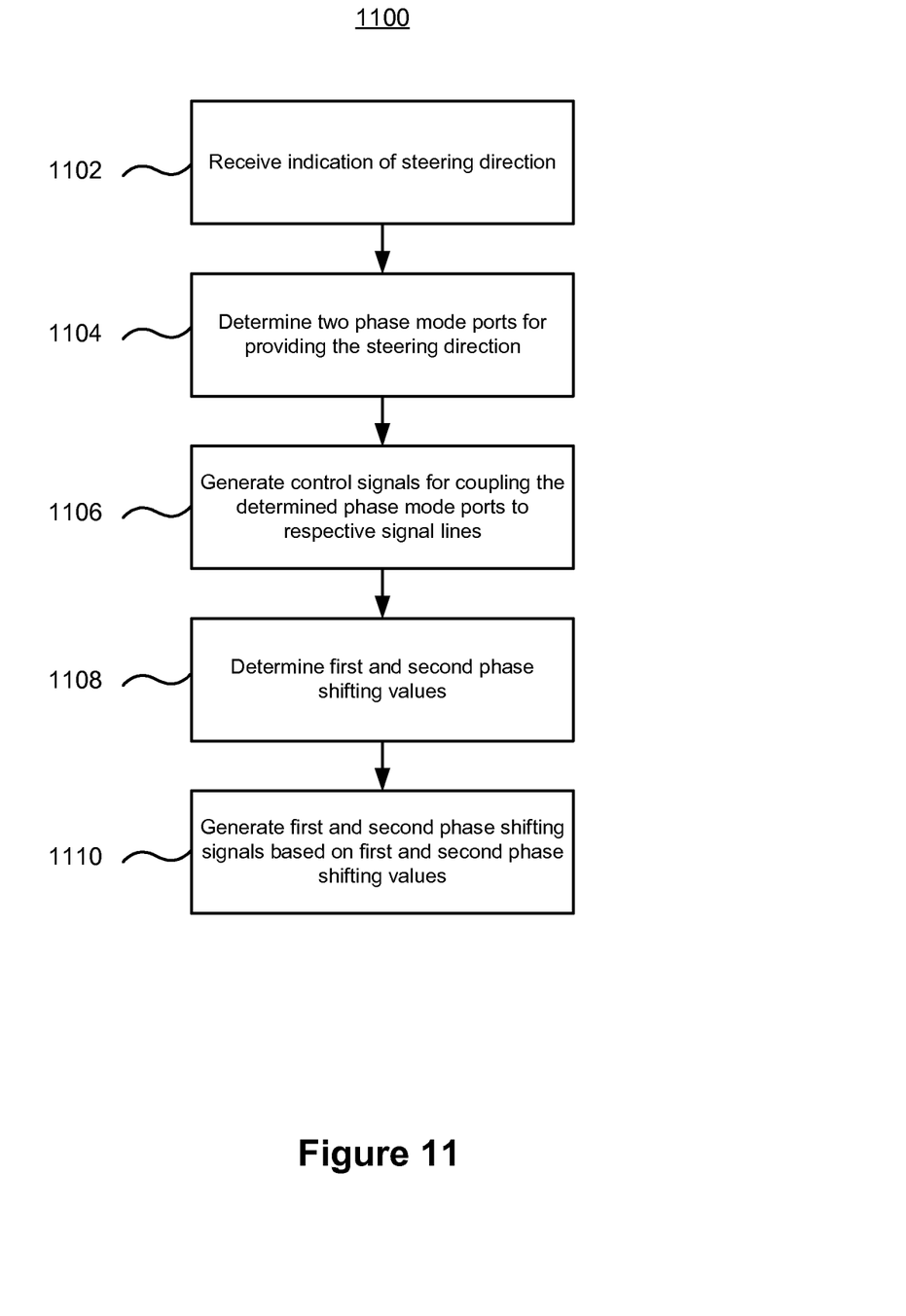
FIG. 11 depicts a method of beam-steering an antenna array.

FIG. 11 depicts a method of beam-steering an antenna array. The method 1100 depicted in FIG. 11 may be implemented by beam steering component such as beam steering component 120 described above. The method 1100 receives an indication of a steering direction of a main beam (1102). As described above, the antenna array may steer a main beam in both an elevation direction and an azimuth direction independently. The indication of the direction may specify both the desired elevation and azimuth direction. Once the indication of the steering direction is received, the two phase modes, and associated phase mode ports, that may be combined together to provide the steering direction are determined (1104). As described above, each of the plurality of phase mode ports is associated with a radiation pattern, such as those depicted in FIGS. 2 to 4. The selected radiation patterns may be combined to provide the main beam. The selection of the radiation patterns and phase mode ports may be based on the indicated steering direction. As described above, the steering direction may be comprised of two angles, an elevation or tilt angle and an azimuth or circumferential direction. One of the angles of the steering direction may be used in selecting the phase mode ports. For example, the selection may be based on a desired elevation or tilt angle. Once the two phase mode ports have been determined, the appropriate signals for controlling switches to connect first and second signal lines to the determine phase mode ports are generated (1106) and applied to the signal switches.

Once the two phase modes have been determined, phase shifting values required to provide the desired steering direction are determined (1108). The determination of the phase shifting values may be determined from equation (2) set forth above, where Ø and θ are the phase shifting values. Once the required phase shifting values are determined, the appropriate signals are generated (1110) for applying the phase shifting values to the phase shifters.

The above has described various functionality provided by various systems or components. The functionality may be provided as a combination of hardware, firmware and software comprising instructions stored in a memory that are executed by a processor. The executed instructions configure devices to provide at least some of the functionality described. Although specific embodiments are described herein, it will be appreciated that modifications may be made to the embodiments without departing from the scope of the current teachings. Accordingly, the scope of the appended claims should not be limited by the specific embodiments set forth, but should be given the broadest interpretation consistent with the teachings of the description as a whole.

What is claimed is:

1. An apparatus for beam-steering an antenna array comprising:
   a plurality of feed ports for coupling to respective phase-mode ports of an antenna array's feed network;
   a main port coupled to a transceiver;
   a phase-mode feed port selector for selectively coupling first and second signal lines to respective ones of the plurality of feed ports; and
   a signal processing circuit for processing signals between the first and second signal lines and the main port, the processing allowing independent scanning of a main beam of the antenna array in both a radial direction and a circumferential direction relative to an array axis perpendicular to a plane of the antenna array, wherein the signal processing circuit comprises:
a first hybrid splitter/combiner;
a first variable phase shifter connected between the first signal line and the first hybrid splitter/combiner;
a second hybrid splitter/combiner coupled to the second signal line and the first hybrid splitter/combiner;
a third hybrid splitter/combiner coupled to the second hybrid splitter/combiner; and
a pair of variable phase shifters connected between the second hybrid splitter/combiner and the third hybrid splitter/combiner,
wherein the phase-mode feed port selector further couples a third signal line to a respective one of the plurality of feed ports through a fourth phase shifter controlled in opposition to the first phase shifter to the first hybrid splitter/combiner.

2. The apparatus of claim 1, wherein the phase-mode feed selector selectively couples the first signal line to a feed port associated with an $n^{th}$ phase-mode port of the antenna array's feed network and the second signal line to a feed port associated with an $n^{th}+1$ or $n^{th}-1$ phase-mode port of the antenna array's feed network.

3. The apparatus of claim 1, wherein the pair of variable phase shifters and the first variable phase shifter are independently controllable.

4. The apparatus of claim 3, wherein the first, second and third phase shifters are controlled over a range of $-\pi$ to $+\pi$ radians.

5. The apparatus of claim 1, wherein a steered main beam is described by:

$$M=k[P_{n+/-1} \cos \emptyset - P_n e^{j\theta} \sin \emptyset]$$

where:
k is a constant;
$P_n$ is provided by the first signal line;
$P_{n+/-1}$ is provided by the second signal line;
$\emptyset$ is provided by a radial control signal for controlling the pair of variable phase shifter; and
$\theta$ is provided by a circumferential control signal for controlling the third variable phase shifter.

6. The apparatus of claim 1, wherein a total number of hybrid splitter/combiners and variable phase shifters is independent of a number of antenna elements in the antenna array.

7. The apparatus of claim 1, further comprising a cascaded input coupled to a cascaded main port of a cascaded circuitry for processing signals of the $0^{th}$ phase mode, the $-1^{st}$ phase mode and the $+1^{st}$ phase mode, wherein the a phase-mode feed port selector can selectively couple the cascaded input to the second line.

8. A steerable antenna array system comprising:
an antenna array feed network comprising a plurality of radiating elements arranged in a circular planar array and a plurality of phase-mode ports each associated with a different phase-mode of the antenna array; and
an apparatus for beam-steering an antenna array comprising:
a plurality of feed ports for coupling to respective phase-mode ports of the antenna array's feed network;
a main port coupled to a transceiver;
a phase-mode feed port selector for selectively coupling first and second signal lines to respective ones of the plurality of feed ports; and
a signal processing circuit for processing signals between the first and second signal lines and the main port, the processing allowing independent scanning of a main beam of the antenna array in both a radial direction and a circumferential direction relative to an array axis perpendicular to a plane of the antenna array,
wherein the signal processing circuit comprises:
a first hybrid splitter/combiner;
a first variable phase shifter connected between the first signal line and the first hybrid splitter/combiner;
a second hybrid splitter/combiner coupled to the second signal line and the first hybrid splitter/combiner;
a third hybrid splitter/combiner coupled to the second hybrid splitter/combiner; and
a pair of variable phase shifters connected between the second hybrid splitter/combiner and the third hybrid splitter/combiner,
wherein the phase-mode feed port selector further couples a third signal line to a respective one of the plurality of feed ports through a fourth phase shifter controlled in opposition to the first phase shifter to the first hybrid splitter/combiner.

9. The system of claim 8, wherein the phase-mode feed selector selectively couples the first signal line to a feed port associated with an $n^{th}$ phase-mode port of the antenna array's feed network and the second signal line to a feed port associated with an $n^{th}+1$ or $n^{th}-1$ phase-mode port of the antenna array's feed network.

10. The system of claim 8, wherein the pair of variable phase shifters and the first variable phase shifter are independently controllable.

11. The system of claim 10, wherein the first, second and third phase shifters are controlled over a range of $-\pi$ to $+\pi$ radians.

12. The system of claim 8, wherein a steered main beam is described by:

$$M=k[P_{n+/-1} \cos \emptyset - P_n e^{j\theta} \sin \emptyset]$$

where:
k is a constant;
$P_n$ is provided by the first signal line;
$P_{n+/-1}$ is provided by the second signal line;
$\emptyset$ is provided by a radial control signal for controlling the pair of variable phase shifter; and
$\theta$ is provided by a circumferential control signal for controlling the third variable phase shifter.

13. The system of claim 8, wherein a total number of hybrid splitter/combiners and variable phase shifters is independent of a number of antenna elements in the antenna array.

14. The system of claim 8, further comprising a cascaded input coupled to a cascaded main port of a cascaded circuitry for processing signals of the $0^{th}$ phase mode, the $-1^{st}$ phase mode and the $+1^{st}$ phase mode, wherein the a phase-mode feed port selector can selectively couple the cascaded input to the second line.

15. A method for beam-steering an antenna array comprising:
receiving an indication of a steering direction of a main lobe;
determining two of a plurality of phase mode ports for providing the desired steering direction;
generating control signals for coupling the determined phase mode ports to respective first and second signal lines;
determining first and second phase shifting values for applying to the respective signal lines to provide the steering direction, the first and second phase shifting values allowing independent scanning of a main beam of the antenna array in both a radial direction and a circumferential direction relative to an array axis perpendicular to a plane of the antenna array;

generating first and second phase shifting signals according to the determined first and second phase shifting values, wherein a steered main beam is described by:

$$M = k[P_{n+/-1} \cos \varnothing - P_n e^{j\theta} \sin \varnothing]$$

where:
  k is a constant;
  $P_n$ is provided by the first signal line;
  $P_{n+/-1}$ is provided by the second signal line;
  $\varnothing$ is provided by the first phase shifting signal for controlling a pair of variable phase shifter; and
  $\theta$ is provided by the second phase shifting signal for controlling a further variable phase shifter.

* * * * *